No. 611,998. Patented Oct. 4, 1898.
B. C. HINMAN.
PROCESS OF AND APPARATUS FOR EXTRACTING GOLD FROM ORES.
(Application filed Dec. 4, 1897.)
(No Model.)
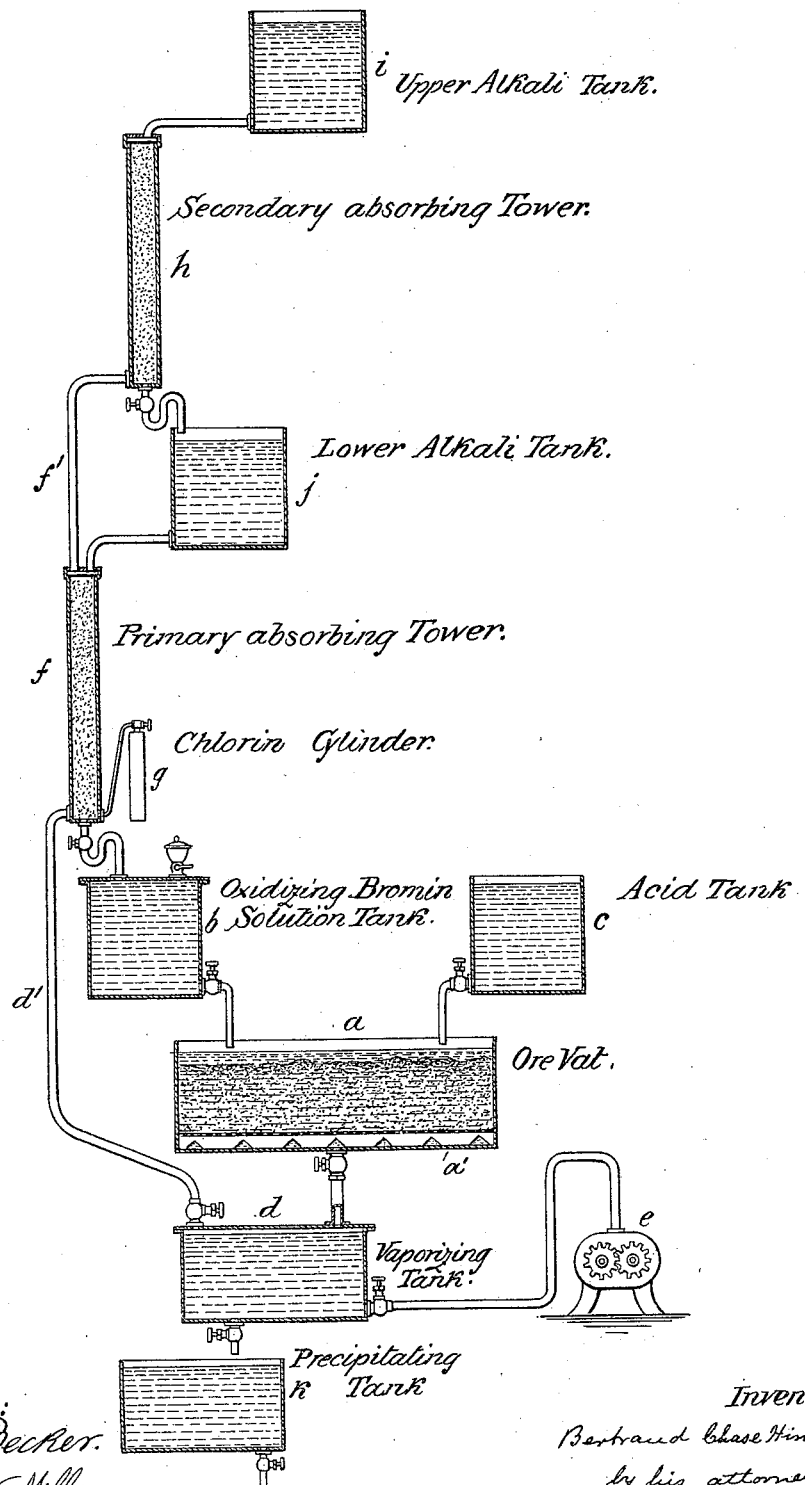

UNITED STATES PATENT OFFICE.

BERTRAND CHASE HINMAN, OF NEW YORK, N. Y., ASSIGNOR TO THE GOLD EXTRACTION AND BROMINE RECOVERY COMPANY, LIMITED, OF LONDON, ENGLAND.

PROCESS OF AND APPARATUS FOR EXTRACTING GOLD FROM ORES.

SPECIFICATION forming part of Letters Patent No. 611,998, dated October 4, 1898.

Application filed December 4, 1897. Serial No. 660,727. (No model.)

*To all whom it may concern:*

Be it known that I, BERTRAND CHASE HINMAN, a citizen of the United States, and a resident of New York, (Brooklyn,) in the county of Kings and State of New York, have invented certain new and useful Improvements in Processes of and Apparatus for Extracting Gold from Ores, of which the following is a specification.

This invention relates to improved means for extracting gold from ore by a salt containing bromin, chlorin, oxygen, and a base.

If acidulated ore is subjected to the action of a simple bromin solution, the free bromin will enter to a greater or lesser extent into combination with the bases of the ore, forming various bromids, which, owing to the diluted state of the solution, will not be decomposed by the mere presence of an acid. With no excess of available oxygen present to set this combined bromin free it will continue to exist as bromid at the end of the leaching operation and can only be recovered by special chemical treatment, which is objectionable for economic reasons. If, however, the acidulated ore is subjected to the action of the salt mentioned, the latter, possessing an excess of available oxygen, decomposes the bromids of the basic constituents of the ore formed during percolation, so that after leaching all the bromin will be found in the free state and can be saved without further chemical treatment of the liquid containing it.

The accompanying drawing represents a sectional elevation of an apparatus for carrying my invention into effect.

The letter $a$ represents the ore-vat containing the filter $a'$ and connected with an acid-tank $c$ and with a tank $b$, which contains a solution of the oxidizing bromin salt. The bottom chamber of tank $a$ communicates with the vaporizing tank-$d$, that is in turn connected to an air-blower $e$. A pipe $d'$ leads from tank $d$ into the lower end of a lower tower $f$, containing pebbles or other obstructive bodies, and which is also charged, near its bottom, with chlorin from a cylinder $g$. From the top of tank $f$ a pipe $f'$ leads to the bottom of a second or upper tower $h$, constructed similar to tower $f$ and connected at its top with a vessel $i$, containing a solution of sodium hydrate in water. At its bottom the upper tower $h$ connects with a vessel $j$, which also communicates with the top of tower $f$. The bottom of this tower $f$ communicates with the tank $b$ to form a continuous cycle.

In carrying out my invention by means of the apparatus described I proceed as follows: The tank $b$ is charged with a salt composed of a bromate and a chlorid of a base, (preferably sodium hydrate,) which salt in the presence of an acid possesses an oxidizing power greater than that required for liberating its own bromin. After the ore in the vat $a$ has been acidulated from tank $c$ the dissolved salt contained in tank $b$ is also admitted to tank $a$. Here the bromin is liberated and a portion of it combines with the gold and also with the base constituents of the ore, such as sulfur, sulfids, ferrous iron, lime, magnesia, &c. Owing to the excess of oxidizing power possessed by the salt all that bromin which has combined with the basic constituents will be at once liberated, so that at the end of the operation all the bromin which has not combined with the gold will exist in the free state.

The function of the chlorin in the process is to effect the formation of the bromate or, in other words, to serve as a carrier of oxygen. The chlorin after combining with the base and exerting its oxidizing action upon the bromin is converted into chlorid, which takes no further active part in the process.

The solution is allowed to remain in contact with the ore until the gold has been dissolved. It is then run into the tank $d$ and water is poured over the ore to wash out the gold and bromin solution contained in the interstices of the ore. The tank $d$ will now contain the gold as bromid and the remainder of the bromin in the free state. This free bromin is now vaporized by turning on blower $e$, the vapors ascending through pipe $d'$ into lower tower $f$, where they are mixed with chlorin from cylinder $g$. The commingled bromin and chlorin vapors rising through the tower meet a divided stream of an alkaline solution admitted at the top of the tower from tank $j$ and obtained in the manner hereinafter described.

If the alkali solution in the tank $j$ is dilute and cold, the bromin in the solution discharged from tower $f$ will be almost entirely combined with the alkali as hypobromite. It is well known, however, that hypobromites are unstable and tend, upon standing or heating, to convert to bromates.

The reaction taking place in tower $f$ is as follows:

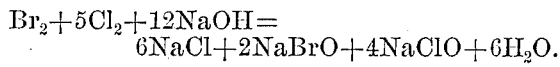
$$Br_2+5Cl_2+12NaOH=$$
$$6NaCl+2NaBrO+4NaClO+6H_2O.$$

Upon heating or allowing to stand in tank $b$ the following changes occur in the second member of the above equation, and thus the final result is as follows:

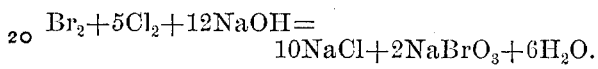
$$Br_2+5Cl_2+12NaOH=$$
$$10NaCl+2NaBrO_3+6H_2O.$$

The product of the operation in tank $b$ will consequently be the original dissolving salt solution—viz., one composed of a bromate and a chlorid of a base and possessing in the presence of an acid an oxidizing power greater than that required to liberate its own bromin. This salt solution is run into tank $b$ to act upon a fresh body of ore for continuous operation.

In order to demonstrate how the salt formed in the second member of equation 1 has the power of liberating more than its own bromin, I will suppose it to be brought into contact with additional combined bromin, such as bromid of sodium, (NaBr,) and an acid, which is practically the condition under which the operation takes place in the leaching-vat. The reaction will then be as follows:

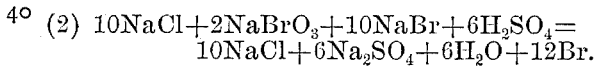
$$(2)\ 10NaCl+2NaBrO_3+10NaBr+6H_2SO_4=$$
$$10NaCl+6Na_2SO_4+6H_2O+12Br.$$

For the purpose of absorbing any excess of bromin and chlorin vapors which may not have combined with the base in tower $f$ the second upper tower $h$ has been provided. Within this tower the escaped vapors meet a solution of sodium hydrate from tank $i$, forming a partly-saturated oxidizing solution. This solution flows into tank $j$ and constitutes the absorbing solution for the tower $f$.

The gold in solution is drawn from tank $d$ into the precipitating-tank $k$, where it is precipitated by sulfureted hydrogen or in any other well-known manner.

At the beginning of a cycle of operations it is advisable to use the dissolving agent in the form of a dry salt, because of the facility with which it is transported to the mines.

What I claim is—

1. The process of extracting gold from ore which consists in subjecting acidified ore to the action of a dissolving agent composed of a chlorid and a bromate of a base, leaching the solution, vaporizing the free bromin, then passing it with chlorin through a solution of a base, and precipitating the gold, substantially as specified.

2. The process of extracting gold from ore which consists in subjecting acidified ore to the action of a dissolving agent composed of a chlorid and a bromate of a base, leaching the solution, vaporizing the free bromin, passing it with chlorin through a solution of a base, and passing any uncombined bromin vapors through a second body of a base, substantially as specified.

3. An apparatus for extracting gold from ore which consists of an ore-vat, a vaporizing-tank, a pair of connected towers, a chlorin-cylinder communicating with the first tower, a pair of alkali-solution tanks communicating with the first and second tower respectively, and connections between the ore-vat, vaporizing-tank, towers and solution-tanks substantially as specified.

Signed at New York, in the county of New York and State of New York, this 2d day of December, A. D. 1897.

BERTRAND CHASE HINMAN.

Witnesses:
F. V. BRIESEN,
WILLIAM MILLER.